US008793377B2

(12) United States Patent
Anderson, III et al.

(10) Patent No.: US 8,793,377 B2
(45) Date of Patent: Jul. 29, 2014

(54) IDENTIFYING OPTIMAL VIRTUAL MACHINE IMAGES IN A NETWORKED COMPUTING ENVIRONMENT

(75) Inventors: Edward H. Anderson, III, Raleigh, NC (US); Jason L. Anderson, Milpitas, CA (US); Gregory J. Boss, Saginaw, MI (US); Timothy R. Echtenkamp, Lincoln, NE (US); Daniel E. Jemiolo, Chapel Hill, NC (US); Lynn M. Koch, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 13/099,399

(22) Filed: May 3, 2011

(65) Prior Publication Data

US 2012/0284380 A1  Nov. 8, 2012

(51) Int. Cl.
G06F 15/173 (2006.01)
H04L 29/06 (2006.01)
(52) U.S. Cl.
CPC ...................................... H04L 29/06 (2013.01)
USPC ......................................... 709/226; 718/104
(58) Field of Classification Search
CPC ............................... H04L 29/06; H04L 47/10
USPC ....................................................... 709/223
See application file for complete search history.

(56) References Cited

U.S. PATENT DOCUMENTS

| 7,437,764 | B1 | 10/2008 | Sobel et al. | |
|---|---|---|---|---|
| 7,574,496 | B2 | 8/2009 | McCrory et al. | |
| 7,793,288 | B2 * | 9/2010 | Sameske | 718/1 |
| 2003/0051021 | A1 | 3/2003 | Hirschfeld et al. | |
| 2003/0229810 | A1 | 12/2003 | Bango | |
| 2009/0222560 | A1 * | 9/2009 | Gopisetty et al. | 709/226 |
| 2009/0300607 | A1 * | 12/2009 | Ferris et al. | 718/1 |
| 2010/0042720 | A1 | 2/2010 | Stienhans et al. | |
| 2010/0088150 | A1 | 4/2010 | Mazhar et al. | |
| 2010/0125664 | A1 | 5/2010 | Hadar et al. | |
| 2010/0125669 | A1 | 5/2010 | Esfahany et al. | |
| 2010/0131948 | A1 | 5/2010 | Ferris | |
| 2010/0198972 | A1 * | 8/2010 | Umbehocker | 709/226 |
| 2011/0072487 | A1 * | 3/2011 | Hadar et al. | 726/1 |
| 2011/0238797 | A1 * | 9/2011 | Wee | 709/220 |
| 2012/0198344 | A1 * | 8/2012 | Tukol et al. | 715/735 |
| 2012/0257820 | A1 * | 10/2012 | Sanghvi et al. | 382/159 |

OTHER PUBLICATIONS

"IBM Advances CloudComputing with New Software", globalservicesmedia.com/News/Home/IBM-Advances-Cloud-Computing-with- . . . Mar. 11, 2011. Author unknown.
Mell et al., "The NIST Definition of Cloud Computing", National Institute of Standards and Technology, Information Technology Laboratory, Version 15, Oct. 7, 2009, 2 pages.

* cited by examiner

*Primary Examiner* — Andrew Chriss
*Assistant Examiner* — Peter Mak
(74) *Attorney, Agent, or Firm* — William E. Schiesser; Keohane & D Alessandro

(57) ABSTRACT

Embodiments of the present invention provide an approach for identifying optimal virtual machine (VM) images in a networked computing environment (e.g., a cloud computing environment). Specifically, in a typical embodiment, a set of system requirements, a profile, and a performance state of the networked computing environment are received as input and analyzed against a library of VM images. Based on the analysis, a set of VM images having software programs (e.g., also referred to herein as a software stack) capable of accommodating requirements defined by the input is identified. A requester can select one or more of the identified VM images, which can then be provisioned/deployed accordingly.

22 Claims, 5 Drawing Sheets

IDENTIFYING OPTIMAL VIRTUAL MACHINE IMAGES IN A NETWORKED COMPUTING ENVIRONMENT

TECHNICAL FIELD

In general, the present invention relates to virtual machine (VM) image management. Specifically, the present invention relates to the identification of optimal VM images in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by an additional abstraction layer (e.g., cloud layer), thus making disparate devices appear to an end-consumer as a single pool of seamless resources. These resources may include such things as physical or logical computing engines, servers and devices, device memory, storage devices, among others.

In a networked computing environment, a user may request an instance of a virtual machine (VM). The VM can have multiple corresponding attributes (e.g., processor speed, disk capacity, memory capacity, etc.). However, challenges exist for identifying optimal VM images (e.g., determining optimal software stacks). Accordingly, it is possible that the VM may not be optimally provisioned.

SUMMARY

Embodiments of the present invention provide an approach for identifying optimal virtual machine (VM) images in a networked computing environment (e.g., a cloud computing environment). Specifically, in a typical embodiment, a set of system requirements, a profile, and a performance state of the networked computing environment are received as input and analyzed against a library of VM images. Based on the analysis, a set of VM images having software programs (e.g., also referred to herein as a software stack) capable of accommodating requirements defined by the input is identified. A requester can select one or more of the identified VM images, which can then be provisioned/deployed accordingly.

A first aspect of the present invention provides a computer-implemented method for identifying optimal virtual machine (VM) images in a networked computing environment, comprising: receiving a set of system requirements from a requester of a VM image; accessing a profile associated with the requester, the profile comprising a set of preferences of the requester; determining a performance state of the networked computing environment; and identifying a set of VM images having a set of software programs capable of accommodating the set of system requirements, the set of preferences, and the performance state of the networked computing environment.

A second aspect of the present invention provides a system for identifying optimal virtual machine (VM) images in a networked computing environment, comprising: a bus; a processor coupled to the bus; and a memory medium coupled to the bus, the memory medium comprising instructions to: receive a set of system requirements from a requester of a VM image; access a profile associated with the requester, the profile comprising a set of preferences of the requester; determine a performance state of the networked computing environment; and identify a set of VM images having a set of software programs capable of accommodating the set of system requirements, the set of preferences, and the performance state of the networked computing environment.

A third aspect of the present invention provides a computer program product for identifying optimal virtual machine (VM) images in a networked computing environment, the computer program product comprising a computer readable storage media, and program instructions stored on the computer readable storage media, to: receive a set of system requirements from a requester of a VM image; access a profile associated with the requester, the profile comprising a set of preferences of the requester; determine a performance state of the networked computing environment; and identify a set of VM images having a set of software programs capable of accommodating the set of system requirements, the set of preferences, and the performance state of the networked computing environment.

A fourth aspect of the present invention provides a method for deploying a system for identifying optimal virtual machine (VM) images in a networked computing environment, comprising: providing a computer infrastructure being operable to: receive a set of system requirements from a requester of a VM image; access a profile associated with the requester, the profile comprising a set of preferences of the requester; determine a performance state of the networked computing environment; and identify a set of VM images having a set of software programs capable of accommodating the set of system requirements, the set of preferences, and the performance state of the networked computing environment.

BRIEF DESCRIPTION OF THE DRAWINGS

These and other features of this invention will be more readily understood from the following detailed description of the various aspects of the invention taken in conjunction with the accompanying drawings in which.

Figure 1:
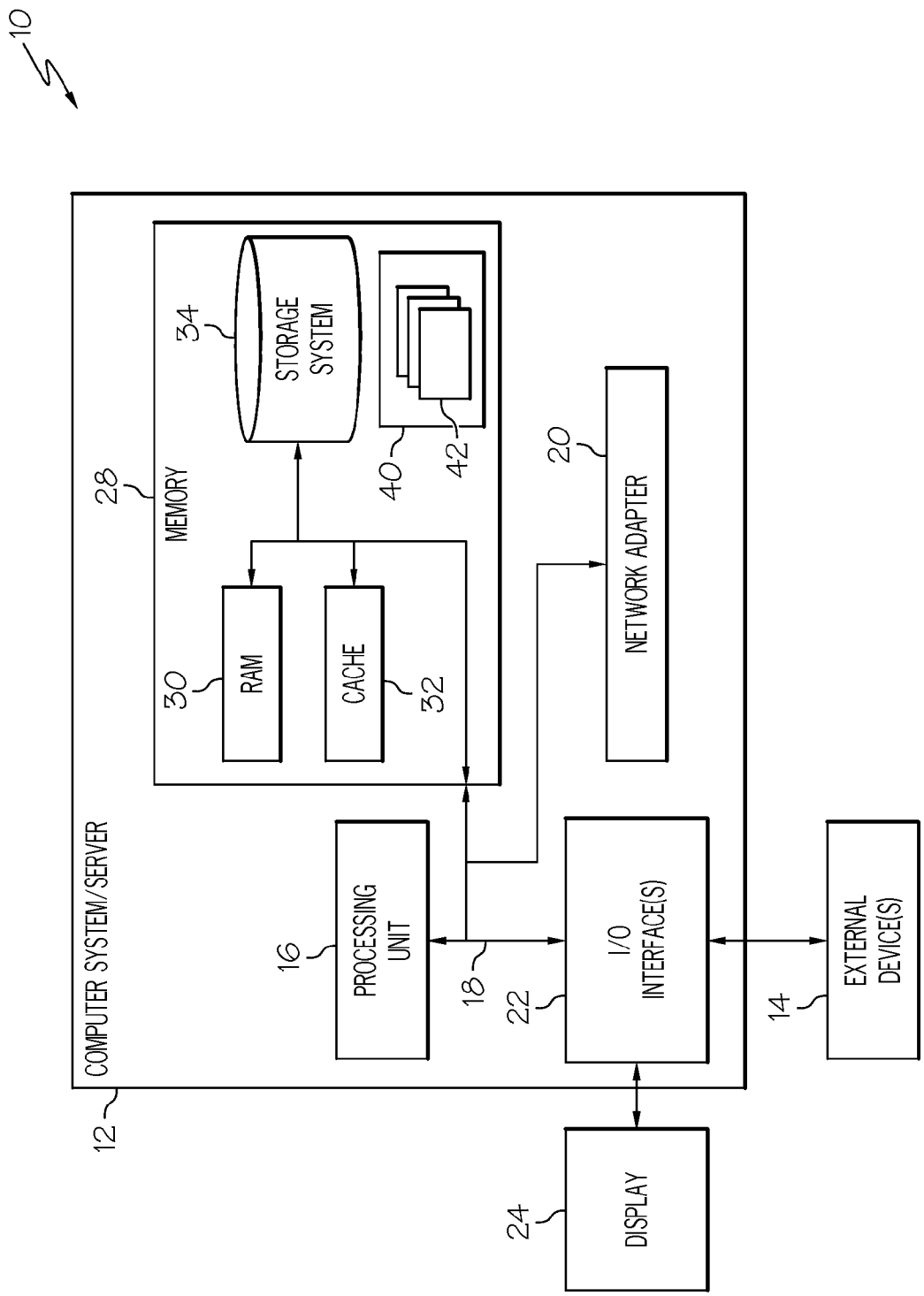
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for identifying optimal virtual machine (VM) images in a networked computing environment (e.g., a cloud computing environment). Specifically, in a typical embodiment, a set of system requirements, a profile, and a performance state of the networked computing environment are received as input and analyzed against a library of VM images. Based on the analysis, a set of VM images having software programs (e.g., also referred to herein as a software stack) capable of accommodating requirements defined by the input is identified. A requester can select one or more of the identified VM images, which can then be provisioned/deployed accordingly.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
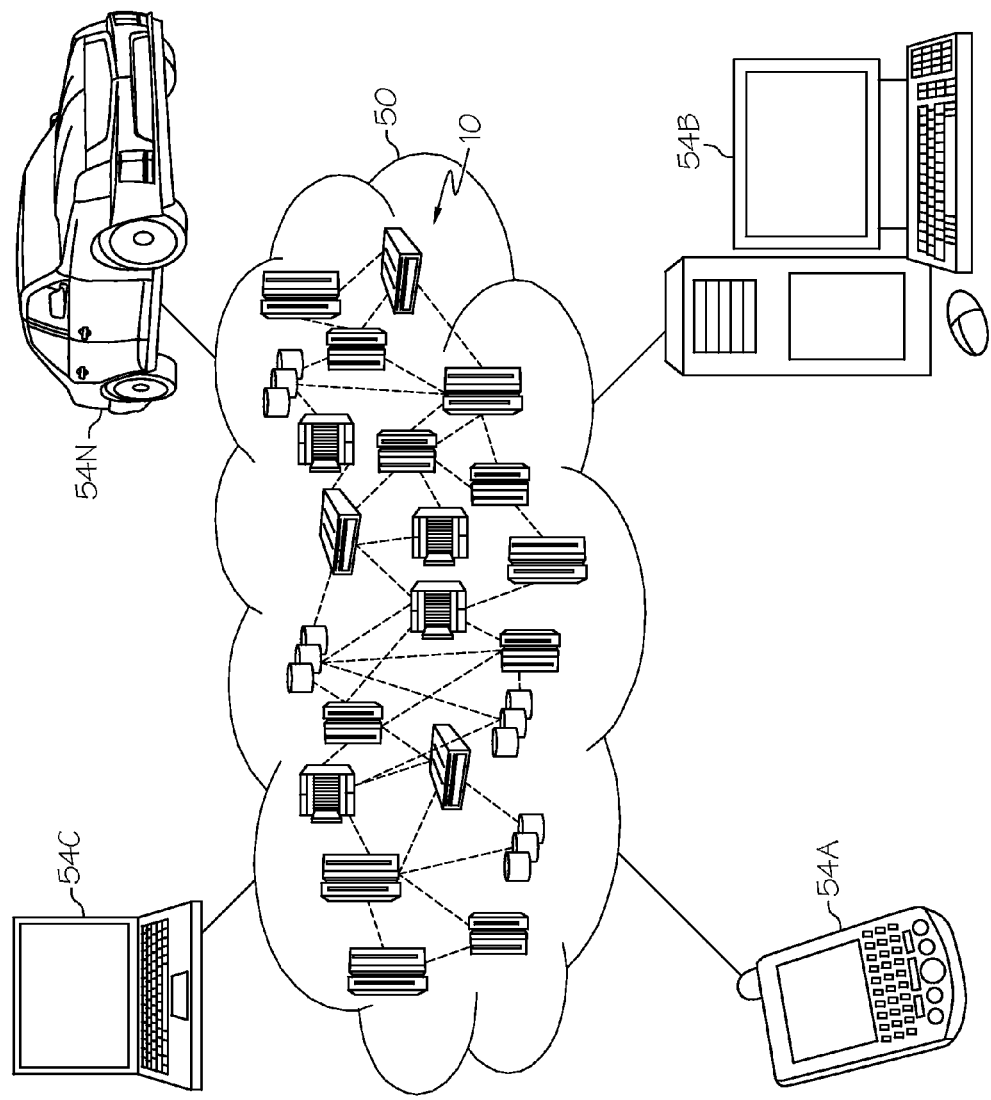
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
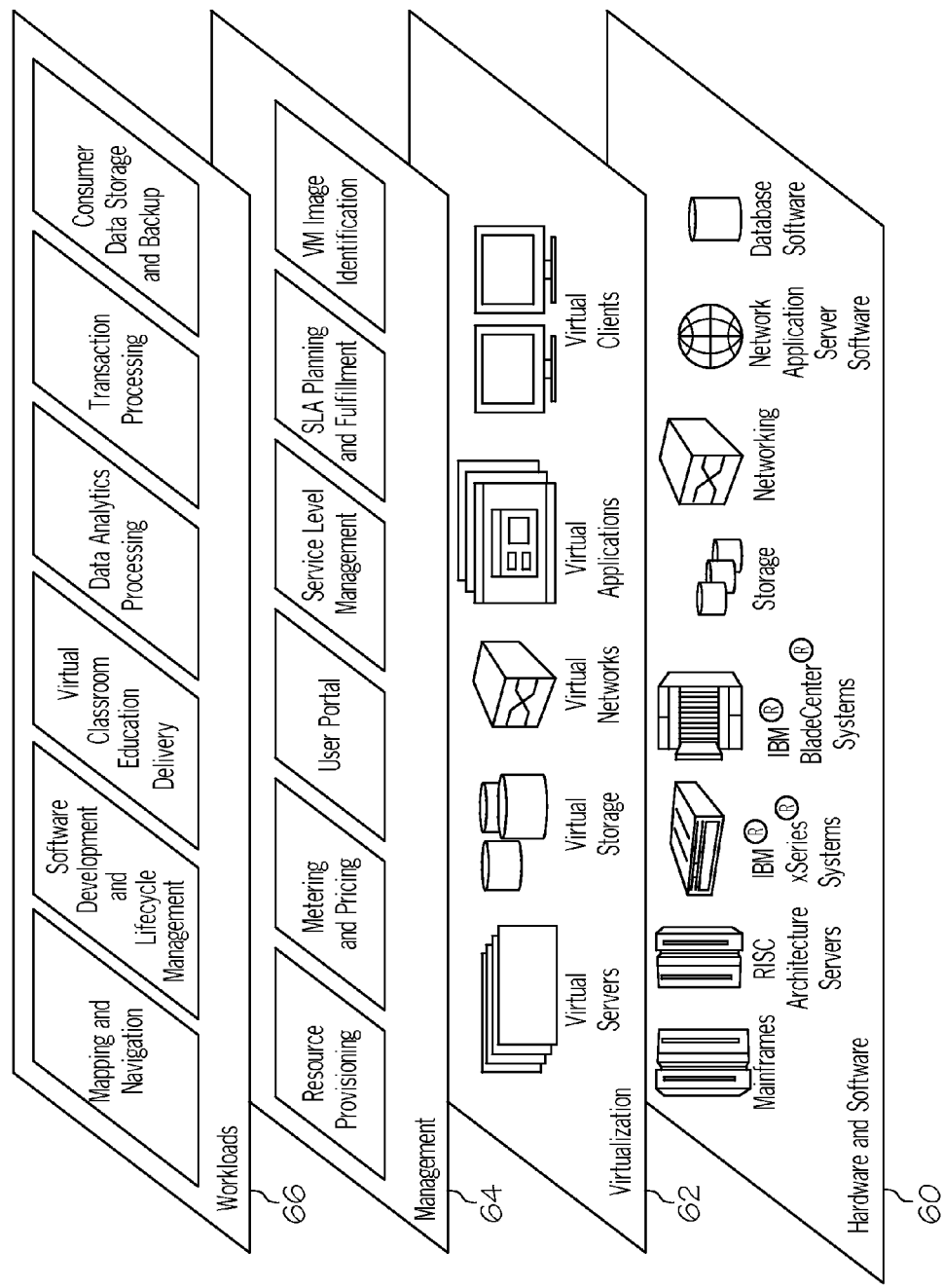
FIG. 3 depicts abstraction model layers according to an embodiment of the present invention.

Referring now to FIG. 3, a set of functional abstraction layers provided by cloud computing environment 50 (FIG. 2)

is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.) are provided:

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer 64 is VM image identification function, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood all the functions of the present invention as described herein typically may be performed by the VM image identification function of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description of cloud computing, implementation of the teachings recited herein are not limited to a cloud computing environment. Rather, the embodiments of the present invention are intended to be implemented with any type of networked computing environment now known or later developed.

Figure 4:
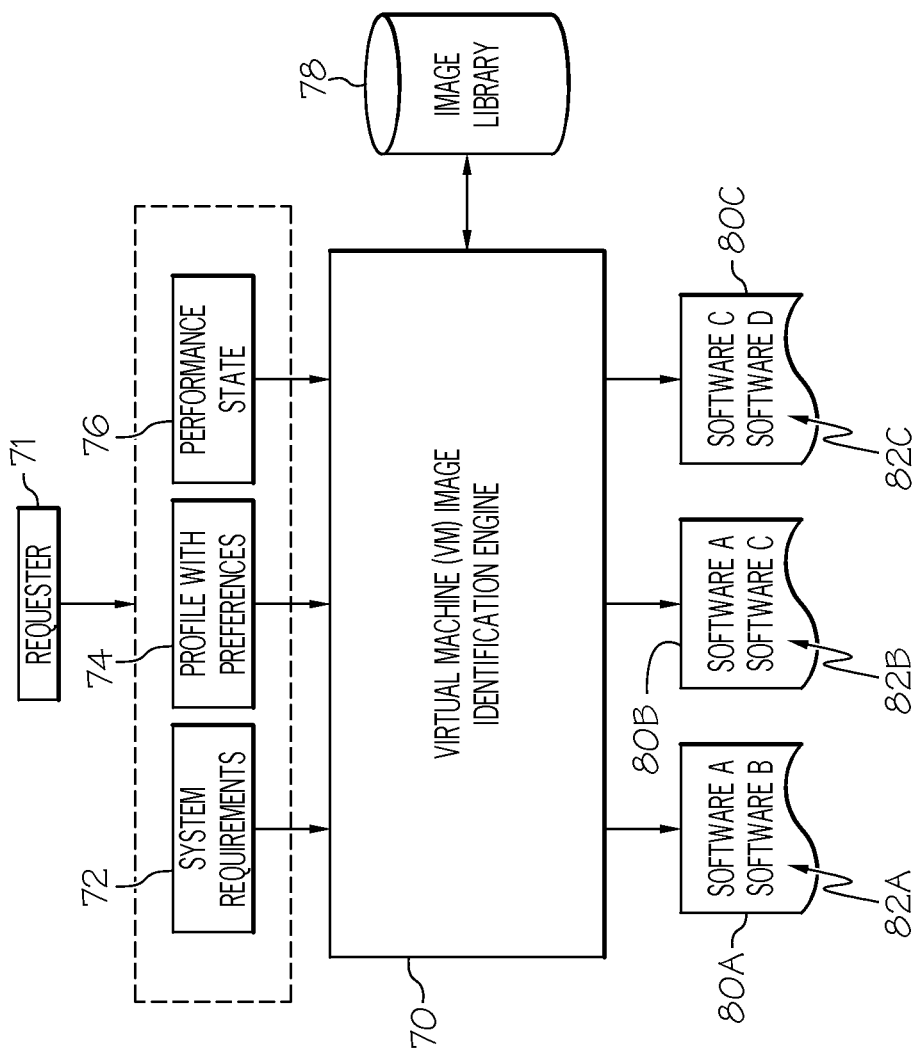
FIG. 4 depicts a system diagram according to an embodiment of the present invention.

Referring now to FIG. 4, a system for identifying optimal VM images in a networked computing environment (e.g., a cloud computing environment) according to an embodiment of the present invention is shown. As depicted, a VM image identification engine 70 is shown. In a typical embodiment, engine 70 performs an analysis/match of image library 78 to identify a set (at least one) of images 80A-C corresponding to a request for a VM from a requester 71 (e.g., a user and/or another system). Specifically, engine 70 will attempt to identify the VM images 80A-C that can best accommodate inputs 72, 74, and 76. As depicted, VM images 80A-C typically comprise, or are associated with, one or more software programs 82A-C. Engine 70 will analyze each image in library 78 to determine which image(s) have the software stacks/programs capable of fulfilling any needs of requester 71 and/or the particular environment in which the image will eventually be provisioned/deployed. It is understood the diagram of FIG. 3 is intended to be illustrative and that the teachings recited herein can accommodate any quantity of inputs and/or images Under the embodiments of the present invention, inputs to engine 70 can include one or more of the following: system requirements 72 (application server requirements, database requirements, etc.); a user/requester profile 74 containing a set of user preferences (e.g., performance preferences, configurability preferences, cost preferences, industry preferences, business size, applicable demographics, etc.) associated with requester 71; and performance state input 76 (e.g., indicating a current state of the environment, such as a memory state, a processing speed state, etc.)

Based on this information, requester 71 could be receive a suggestion as to an image (e.g., comprising a set of software programs or a "software stack") that is based on to the VMs the consumer has previously deployed in other projects (e.g., historical data). The following algorithm can be used to determine which software stack would be best to recommend to requester 71. While the algorithm takes into account all the images currently running in the environment, more weight is given to those templates which are also provisioned by those in the same industry and the same type of business. It is noted that requester 71 could be presented with all possible options that fulfill their intended workload so that requester 71 has the option to decline the recommendations and use other VM images.

Illustrative Algorithm

Shown below is an illustrative algorithm that can be implemented by engine 70 to carry out the aforementioned functionality. Function Prototype(s)/Description(s)

Score (VM Template "t", Preference "p, Scope "s")—this approach rates on a 0 to 1 scale (0 being no recommendation and 1 being a full recommendation) how well VM Template "t" aligns with the user Preference "p" for the previously provisioned instances within Scope "s".

Algorithm Steps:

1) for each VM Template "t" which fulfills the cloud consumer's cloud workload do:
2) for each preference "p" do:
3) allscore[t][p]=score(t,p,all)
4) for each preference "p" do:
5) industryScore[t][p]=score(t,p,industry)
6) for each preference "p" do:
7) businessSizeScore[t][p]=score(t,p,businessSize)

8) score[t]=sum(allScore[t][:])+0.5*sum(industryScore[t][:])+0.5*sum(businessSizeScore[t][:])

9) return VM Template "t" for $\mathrm{argmax}_t$ (score[t][:])

Figure 5:
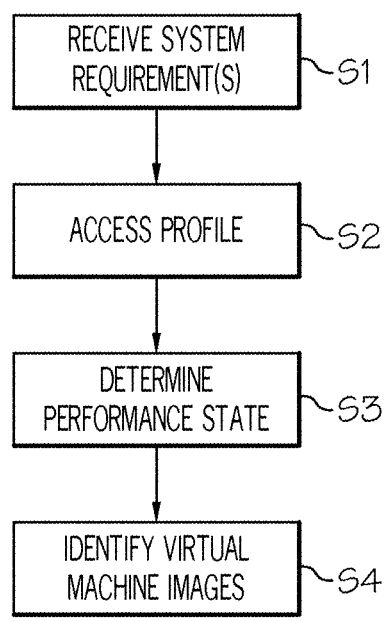
FIG. 5 depicts a method flow diagram according to an embodiment of the present invention.

Referring now to FIG. 5, a method flow diagram according to an embodiment of the present invention is shown. As depicted, in step S1, a set of system requirements is received from a requester of a VM image. In step S2, a profile associated with the requester is accessed. As indicated above, the profile can comprise a set of preferences of the requester. In step S3, a performance state of the networked computing environment is determined. In step S4, a set of VM images having a set of software programs capable of accommodating the set of system requirements, the set of preferences, and the performance state of the networked computing environment is identified. Thereafter, the requester can select one or more of the set of images, which can then be provisioned accordingly.

While shown and described herein as a VM image identification solution, it is understood that the invention further provides various alternative embodiments. For example, in one embodiment, the invention provides a computer-readable/useable medium that includes computer program code to enable a computer infrastructure to provide VM image identification functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide VM image identification functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for VM image identification. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for identifying optimal virtual machine (VM) images in a networked computing environment, comprising:

defining a virtual machine (VM) image as a self-contained virtual server having an operating system and a set of software applications;

receiving a set of system requirements from a requester of the VM image;

accessing a profile associated with the requester, the profile comprising a set of preferences of the requester;

determining a performance state of the networked computing environment;

analyzing, based on historical data relating to VM images previously deployed by the requester, each VM image in an image library containing a plurality of currently running VM images in the environment, wherein a greater weight is assigned to at least one VM image previously provisioned for the requester;

identifying, based on the analysis, a set of VM images from the image library, the set of images having a set of software programs capable of accommodating the set of system requirements, the set of preferences, and the performance state of the networked computing environment, wherein the analysis assigns a greater weight to at least one VM image, from the image library, previously provisioned in an industry of the requester;

presenting to the requester the identified set of VM images as recommended VM images; and providing the requester with an option to decline the recommended VM images and use VM images from the image library other than the recommended VM images.

2. The computer-implemented method of claim 1, the set of system requirements comprising at least one of the following: an application server requirement or a database requirement.

3. The computer-implemented method of claim 1, the set of preferences comprising at least one of the following: a performance preference, a configurability preference, or a cost preference.

4. The computer-implemented method of claim 1, the performance state comprising at least one of the following: a memory state, or a processing speed state.

5. The computer-implemented method of claim 1, further comprising receiving a selection of at least one of the set of VM images from the requester.

6. The computer-implemented method of claim 5, further comprising provisioning the selection.

7. The computer-implemented method of claim 1, the identifying comprising matching the set of system requirements, the set of preferences, and the performance state against the library of VM images to identify the set of VM images.

8. A system for identifying optimal virtual machine (VM) images in a networked computing environment, comprising:
a bus;
a processor coupled to the bus; and
a memory medium coupled to the bus, the memory medium comprising instructions to:
defining a virtual machine (VM) image as a self-contained virtual server having an operating system and a set of software applications;
receive a set of system requirements from a requester of the VM image, the set of system requirements comprising application server requirements and database requirements;
access a profile associated with the requester, the profile comprising a business size of the requester, demographics of the requester, and a set of preferences of the requester, the set of preferences comprising performance preferences, configurability preferences, cost preferences, and industry preferences;
determine a performance state of the networked computing environment;
analyze, based on historical data relating to images previously deployed by the requester, each image in an image library containing a plurality of currently running images in the environment, wherein a greater weight is assigned to at least one VM image previously provisioned for the requester;
identify, based on the analysis, a set of VM images from the image library, the set of images having a set of software programs capable of accommodating the set of system requirements, the set of preferences, and the performance state of the networked computing environment;
present to the requester the identified set of VM images as recommended VM images; and
provide the requester with an option to decline the recommended VM images and use VM images from the image library other than the recommended VM images.

9. The system of claim 8, the set of system requirements comprising at least one of the following: an application server requirement or a database requirement.

10. The system of claim 8, the set of preferences comprising at least one of the following: a performance preference, a configurability preference, or a cost preference.

11. The system of claim 8, the performance state comprising at least one of the following: a memory state, or a processing speed state.

12. The system of claim 8, the memory medium further comprising instructions to receive a selection of at least one of the set of VM images from the requester.

13. The system of claim 12, the memory medium further comprising instructions to provision the selection.

14. The system of claim 8, the memory medium further comprising instructions to match the set of system requirements, the set of preferences, and the performance state against the library of VM images to identify the set of VM images.

15. A computer program product for identifying optimal virtual machine (VM) images in a networked computing environment, the computer program product comprising a non-transitory computer readable storage media, and program instructions stored on the non-transitory computer readable storage media, to:
define a virtual machine (VM) image as a self-contained virtual server having an operating system and a set of software applications;
receive a set of system requirements from a requester of the VM image;
access a profile associated with the requester, the profile comprising a set of preferences of the requester;
determine a performance state of the networked computing environment;
analyze, based on historical data relating to images previously deployed by the requester, each image in an image library containing a plurality of currently running images in the environment, wherein a greater weight is assigned to at least one VM image previously provisioned to at least one user other than the requester in an industry of the requester;
identify, based on the analysis, a set of VM images from the image library, the set of images having a set of software programs capable of accommodating the set of system requirements, the set of preferences, and the performance state of the networked computing environment;
present to the requester the identified set of VM images as recommended VM images; and
provide the requester with an option to decline the recommended VM images and use VM images from the image library other than the recommended VM images.

16. The computer program product of claim 15, the set of system requirements comprising at least one of the following: an application server requirement or a database requirement.

17. The computer program product of claim 15, the set of preferences comprising at least one of the following: a performance preference, a configurability preference, or a cost preference.

18. The computer program product of claim 15, the performance state comprising at least one of the following: a memory state, or a processing speed state.

19. The computer program product of claim 15, further comprising program instructions stored on the non-transitory computer readable storage media to receive a selection of at least one of the set of VM images from the requester.

20. The computer program product of claim 19, further comprising program instructions stored on the non-transitory computer readable storage media to provision the selection.

21. The computer program product of claim 15, further comprising program instructions stored on the non-transitory computer readable storage media to match the set of system requirements, the set of preferences, and the performance state against the library of VM images to identify the set of VM images.

22. A method for deploying a system for identifying optimal virtual machine (VM) images in a networked computing environment, comprising:
   providing a computer infrastructure being operable to:
      define a virtual machine (VM) image as a self-contained virtual server having an operating system and a set of software applications;
      receive a set of system requirements from a requester of the VM image, the set of system requirements comprising application server requirements and database requirements;
      access a profile associated with the requester, the profile comprising a business size of the requester, demographics of the requester, and a set of preferences of the requester, the set of preferences comprising performance preferences, configurability preferences, cost preferences, and industry preferences;
      determine a performance state of the networked computing environment;
      analyze, based on historical data relating to images previously deployed by the requester, each image in an image library containing a plurality of currently running images in the environment, wherein a greater weight is assigned to at least one VM image previously provisioned to at least one user other than the requester in an industry of the requester; and
      identify, based on the analysis, a set of VM images from the image library, the set of images having a set of software programs capable of accommodating the set of system requirements, the set of preferences, and the performance state of the networked computing environment;
   present to the requester the identified set of VM images as recommended VM images; and
   provide the requester with an option to decline the recommended VM images and use VM images from the image library other than the recommended VM images.

* * * * *